United States Patent

[11] 3,604,323

| [72] | Inventor | Claude A. Baumann<br>Strasbourg-Meinau, France |
|---|---|---|
| [21] | Appl. No. | 791,144 |
| [22] | Filed | Jan. 14, 1969 |
| [45] | Patented | Sept. 14, 1971 |
| [73] | Assignee | Huileries Alsaciennes S. A.<br>Strasbourg-Port-du-Rhin (Bas-Rhin), France |
| [32] | Priority | Jan. 17, 1968 |
| [33] | | France |
| [31] | | 9067 |

[54] PRODUCT FOR THE PROTECTION OF CONCRETED COVERINGS AND METHOD OF USING SAID PRODUCT
6 Claims, No Drawings

[52] U.S. Cl. .................................................. 94/22, 117/123
[51] Int. Cl. .................................................. E01c 21/00
[50] Field of Search .................................................. 94/22, 25, 24; 117/123 C, 123 D

[56] References Cited
UNITED STATES PATENTS
2,575,170  11/1951  Holmes .......................... 94/25

FOREIGN PATENTS
1,526,001  4/1968  France .......................... 94/22

*Primary Examiner*—Jacob L. Nackenoff
*Attorney*—Ernest G. Montague

ABSTRACT: A product and a method of using same for the protection of concrete coverings against damage due to the use of salts for the removal of slippery ice, in which for the removal of the traces of a liquid membrane curing compound (LMCC) remaining on the roadway, the latter is dissolved into a mixture according to French Patent Specification No. 1526001 (which is formed by a balanced mixture of a blown, oxidized, boiled linseed oil with addition of salts of lead, manganese and cobalt of an aliphatic solvent, which has a density of 0.772, which distils between 168 and 195° C., has a kauributanol index of 30, an aniline point of 73, a sulfur content of less than 20 parts per thousand, an aromatic content of less than 5 percent and a flash point lying above 55° C., but by replacing the solvent contained in this product by an aromatic or chlorinated solvent, such as trichloroethylene, xylene, toluene, etc., in such quantity that the mixture including the traces of the after-treatment product LMCC possesses a viscosity which renders its penetration as impregnation products into the concrete possible, the quantity of active product being the same as that in the mixture forming the object of the mentioned patent French specification.

3,604,323

PRODUCT FOR THE PROTECTION OF CONCRETED COVERINGS AND METHOD OF USING SAID PRODUCT

INTRODUCTION AND BACKGROUND OF THE INVENTION

The present invention relates to a product for the protection of concreted coverings against damage due to the use of salts for the removal of slippery ice, and to a method of using the same.

French Pat. No. 1,526,001 has for its object a product for the protection of concrete coverings against damage due to the use of salts for the removal of slippery ice, such damage being the physical consequence of the penetration of frost into the mass of the concrete, which product comprises a balanced mixture of a blown, oxidized, boiled, linseed oil with addition of salts of lead, manganese and cobalt and of an aliphatic solvent which has a density of 0.772, distils between 168 and 195° C., has a kauributanol index of 30, an aniline point of 73, a sulfur content of less than 20 parts per thousand, an aromatic content of less than 5 percent and a flash point lying above 55° C., the mixture applying 80 to 90 g. of oil per square meter of the structure to be treated, while the weight ratio preferably amounts to 55 percent oil and 45 percent solvent, this mixture being sprayed at a temperature of at least 10° C., normally at 18 to 20° C., and most expediently at 24° C., onto a concrete the humidity of which in its upper section amounts to 75 percent to 85 percent of its saturation humidity, the application taking place in two layers of which the first comprises one liter per nine square meters the second one liter for every twelve to fifteen square meters, the second layer being applied several hours after the first, when the first layer feels dry.

So that the product as described in the mentioned patent specification may fulfill its protective functions, it must be applied to a concrete which has assumed its normal porosity in a natural manner.

However road building undertakings frequently coat the concrete with liquid membrane curing compounds constituting after-treatment products which form a skin and temporarily close the pores of the concrete, so that the product forming the object of the French patent specification cannot penetrate.

While certain products for the after-treatment of concrete are rapidly removed by weather effects, there are others which contain for example chlorinated rubber or other natural or artificial elastomers which possess a very strong adhesive capacity.

In order to recover the porosity necessary for the application of the mixture forming the object of the mentioned French patent specification, in good time, the traces of the after-treatment product must be removed.

BRIEF SUMMARY OF THE INVENTION

It is an object of the present invention to provide a mixture on the basis of linseed oil which corresponds to the product of the mentioned French patent specification, but in which the provided solvent is replaced by an aromatic or chlorinated solvent, for example, trichloroethylene, xylene, toluene, etc.

FURTHER DESCRIPTION AND ADVANTAGES OF THE INVENTION

The proportions of this new mixture, including the traces of the after-treatment product, are so selected that the mixture has a viscosity which permits it to penetrate into the concrete, that is, a viscosity which is similar to that of the product of the mentioned French patent specification, namely a viscosity of 10 to 12 poises.

The composition of the product can fluctuate according to the remaining quantities of the after-treatment product.

DETAILED DESCRIPTION AND PREFERRED EXAMPLE

As in the mixture which forms the object of the mentioned French Patent Specification No. 1,526,001, in which a first coat of about 50 g. of the active product dissolved in 0.06 liter of solvent is applied per square meter, the same quality of active product must be maintained for the produce obtained for this new mixture.

If for example 20 g. of after-treatment product per square meter remain on the roadway, it is necessary to apply only (50−20)=30 g. of active product.

On the other hand the proportion of the solvent is increased in order to improve the dispersion capacity of the mixture, for example, by the addition of the 30 g. of linseed oil to 0.12 liter of solvent.

Thus in a first coating a quantity of the mixture is applied which contains for example 20 percent by volume of linseed oil and 80 percent by volume of solvent, in such a way that 30 grams per square meter of linseed oil are applied to the concrete.

A second possibility according to the invention, which is to effect the penetration of the after-treatment product into the concrete, so that the mixture can be applied in accordance with the mentioned French patent specification, comprises spraying one of the above-mentioned aromatic or chlorinated solvents onto the roadway.

This spraying brings the remaining after-treatment product into solution again and renders possible its penetration into the concrete.

By way of example it is possible to spray 0.10 to 0.15 liters of solvent per square meter onto the concrete, this quantity however depending upon the quantity of after-treatment product remaining on the roadway.

Finally another possibility for the removal of the after-treatment product and for rendering possible the application of the mixture according to the mentioned French patent specification comprises modifying the after-treatment product from the outset due to the fact that metal salts, especially copper or cobalt salts, for example copper or cobalt naphthenates, are worked into the after-treatment product before its application.

This working in of metal salts improves the destructibility of the after-treatment product by exposure to light and thereby facilitates its removal.

The quantity of metal salts which must be added to an after-treatment product based upon chlorinated rubber in order to improve its destructibility by light exposure lies for example between 1 and 3 percent of metal per kg. of elastomer.

I claim:

1. A product for the protection of concrete coverings against damage due to the use of salts for the removal of slippery ice, and for the removal of the traces of a liquid membrane curing compounds (LMCC) remaining on the roadway, comprising
    a mixture which is formed of a balanced mixture of a blown, oxidized, boiled, linseed oil with addition of salts of lead, manganese and cobalt and of an aromatic or chlorinated solvent in such quantity that the mixture including the traces of said liquid membrane curing compound has a viscosity of 10 to 12 centipoises which renders possible its penetration into the concrete.

2. The product, as set forth in claim 1, wherein said solvent is selected from the group consisting of trichloroethylene, xylene, and toluene.

3. The product, as set forth in claim 1, wherein said solvent is trichloroethylene.

4. The product, as set forth in claim 1, wherein said solvent is xylene.

5. The product, as set forth in claim 1, wherein said solvent is toluene.

6. A method for the use of a product for the protection of concrete coverings against damage due to the use of salts for the removal of slippery ice, wherein for the removal of the traces of a liquid membrane curing compound (LMCC) remaining on a roadway the latter is dissolved into a mixture which is formed by a balanced mixture of a blown, oxidized, boiled, linseed oil with addition of salts of lead, manganese and cobalt and of an aromatic or chlorinated solvent in such quantity that the mixture including the traces of said liquid membrane curing compound has a viscosity of 10 to 12 centipoises which renders possible its penetration into the concrete comprising the steps of spraying said aromatic or chlorinated solvent onto said roadway in order to effect the penetration of said liquid membrane curing compound into the concrete, and subsequently using an antispalling compound.